United States Patent [19]

Persson

[11] Patent Number: 4,968,237

[45] Date of Patent: Nov. 6, 1990

[54] MOULDING TOOL

[75] Inventor: Lars T. Persson, Kristianstad, Sweden

[73] Assignee: Telefonaktiebolaget L M Ericsson, Stockholm, Sweden

[21] Appl. No.: 364,239

[22] Filed: Jun. 12, 1989

[30] Foreign Application Priority Data

Jun. 23, 1988 [SE] Sweden ................ 8802385

[51] Int. Cl.⁵ .................................. B29C 45/14
[52] U.S. Cl. ........................... 425/129.1; 425/468; 425/542
[58] Field of Search .............. 425/405.1, 468, 577, 425/555, DIG. 10, 129.1, 451.9, 450.1, 542; 264/328.7, 328.8, 328.9

[56] References Cited

U.S. PATENT DOCUMENTS 2,575,734 11/1951 Schulman .............. 425/405.1
2,658,237 11/1953 Cuppett et al. .......... 264/328.9 X
4,330,250 5/1982 Pinkas ...................... 425/389
4,658,618 4/1987 Hellgren ............... 425/405.1 X

FOREIGN PATENT DOCUMENTS 8300391 8/1987 Sweden .

WO8607005 12/1986 World Int. Prop. O. .

Primary Examiner—Richard L. Chiesa
Attorney, Agent, or Firm—Burns, Doane, Swecker & Mathis

[57] ABSTRACT

Moulding tool (21), including an upper (22) and a lower (23) mound half, each with its recess, these recesses together forming a cavity (24) of the tool. The upper half (22) has a diaphragm (27) defining the cavity (24), on the rear side of which there is a space (31). Cores (25, 26) are fixed in the lower half (23), the ends (36) of theses cores engaging against the diaphragm (27). Raw material, e.g. plastics, is injected through a sprue (33) under high pressure into the cavity (24). Oil under pressure is pumped (34) through a duct (32) into the space (31) to keep the diaphragm (27) into engagement against the ends (36) of the cores. The plastics is thus prevented from penetrating between the ends (36) of the cores and the diaphragm (27), and friction forces between the diaphragm (27) and core (26) prevents the latter from being deflected laterally by the injected plastics. The manufactured products are free from flash, and disturbances in production and repair costs due to spoiled cores are small.

5 Claims, 4 Drawing Sheets

MOULDING TOOL

TECHNICAL FIELD

The present invention relates to a moulding tool including a mould with a cavity in which raw material intended for moulding is introduced and moulded under pressure.

BACKGROUND ART

In compression moulding and injection moulding large demands are often made on tight dimensional tolerances of the finished products. In order to maintain these tight tolerances, it is necessary in many applications for the raw material to be inserted in the mould cavity under very high pressure. This pressure can be so great that the material in the mould walls, often steel, is subjected to a re-crystalisation, so that the steel is compacted and the size of the cavity increases. This change in the mould is small but may be of great importance, e.g. if the mould has a core for giving shape to a hole through the product. At one end the core is fastened in one mould half and extends from the cavity wall of this half to the cavity wall in the other half of the mould. The other end of the core engages against the opposing cavity wall, and the engagement surface there between is here called the "core print". During material compression and dimensional changes in the mould during injection moulding a gap occurs between the core and the wall at the core print. The material to be moulded can penetrate into this gap and thereby blank off the hole through the product. In the known art, this is counteracted by the core being made somewhat longer than the distance between the opposing cavity walls. When the mould halves are pressed against each other in the injection moulding process, the core is elastically deformed by compression in its longitudinal direction. The dimensional change in the mould occuring during injection is compensated by the ability of the core to expand elastically in its longitudinal direction and engage with its free end against the cavity wall. The mentioned gap is thus prevented at the core print. However, the stresses occurring in the core at its compression are so great that the material is rapidly fatigued and the core cracks. This results in production downtime and costs for replacing the spoiled core.

A mould for injection moulding a plastics frame on a glass pane is illustrated in the Swedish patent No. 8300391-3. The mould has two halves, the cavities of which form a cavity corresponding to the shape of the frame. The edge parts of the glass pane project into the cavity and each of the mould havles has a projecting edge part engaging against the pane. To prevent the plastics material from coming out into the gap between the edge parts of the mould halves and the glass pane during moulding it is proposed that strips of elastic material are clamped in the gap. This method is only usable for relatively low pressures in the mould, and the method is complicated to apply.

DISCLOSURE OF INVENTION

The above-mentioned problem is solved in accordance with the invention by the cavity having walls which can be displaced in relation to each other so that the size change in the cavity is compensated.

The invention has the characterizing features disclosed in the accompanying claims.

BRIEF DESCRIPTION OF DRAWINGS

An embodiment example of the invention will now be described below in connection with the Figures, where.

BEST MODE FOR CARRYING OUT THE INVENTION

Figure 1:
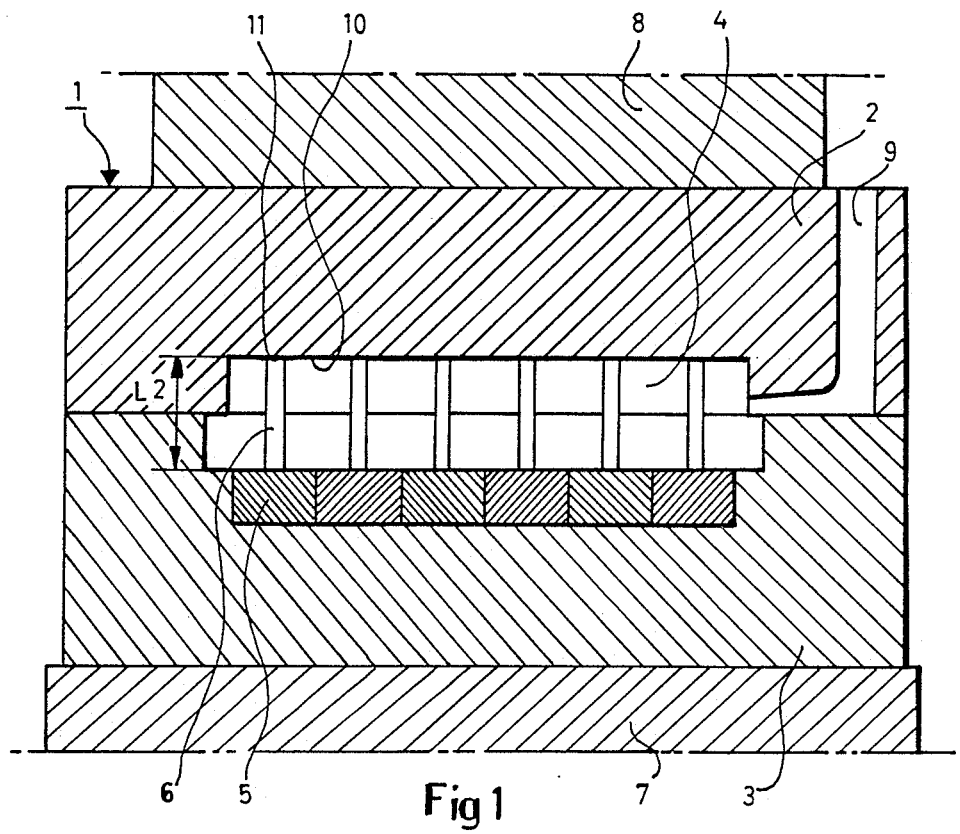
FIG. 1 is a cross section of an injection mould in the known art.

In FIG. 1 there is illustrated a mould 1 for injection moulding plastics to the known art. The mould in the example is intended for electrical connection means, including an elongate plastics body with two rows of holes. The holes are intended for metal connection pins. The mould has upper 2 and lower 3 mould halves which are recessed on their mutually opposing surfaces. The recesses form together a cavity corresponding to the shape of the connection means. The recess in the lower mould half 3 has core blocks, each of which has two cores 6. These cores form holes in the plastic body for the electrical connection pins. Both mould halves 2 and 3 are mutually located with the aid of a table 7 and an upper movable part 8 in a press, which is not more closely illustrated. The upper mould half 2 has a sprue 9, through which the raw plastics material is injected under pressure into the cavity 4.

Great demands are made on the dimensional accuracy of the injection moulded plastic body. It shall be possible, for example, to insert the electrical connection pins on the plastic body into holes in a circuit board, and the holes in the body must lie directly opposite the holes in the circuit board. The shrinkage of the plastic body occuring after injection moulding must therefore be well planned and uniform along the length of the body. The plastics material shall therefore have a uniform structure in the entire plastic body, which can only be achieved by the raw material being injected from one end of the cavity 4 through the illustrated sprue 9. The pressure at which the raw material is injected is often very high, over 1500 bar, for the material to fill the cavity properly, even right up to its farther end. This high pressure is the cause of the material in the mould halves 2 and 3 being compacted.

Figure 2:
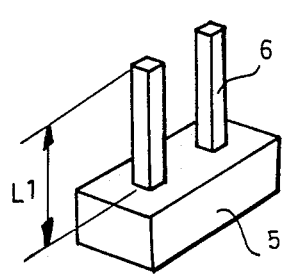
FIG. 2 is a perspective view of a block with cores for the mould.
Figure 3:
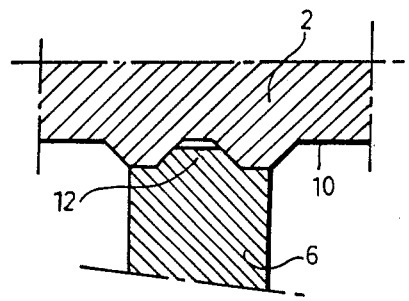
FIG. 3 is a cross section to an enlarged scale through the end of a known core.

One of the mould blocks 5 with the cores 6 is more closely shown in FIG. 2. The cores have a length L1, which is somewhat greater than the height L2 of the cavity 4, so that during injection the cores engage against the upper wall 10 of the cavity at the core print 11, as mentioned in the introduction. A detail of the core print is illustrated in FIG. 3. The core 6 has at its free end a projection 12, which projects into a complementary recess in the upper mould half 2 for locating the core laterally. Injection of the raw material takes place at a great rate, and the material flowing in can deflect the cores 6 laterally if they do not have the projection 12.

Figure 4:
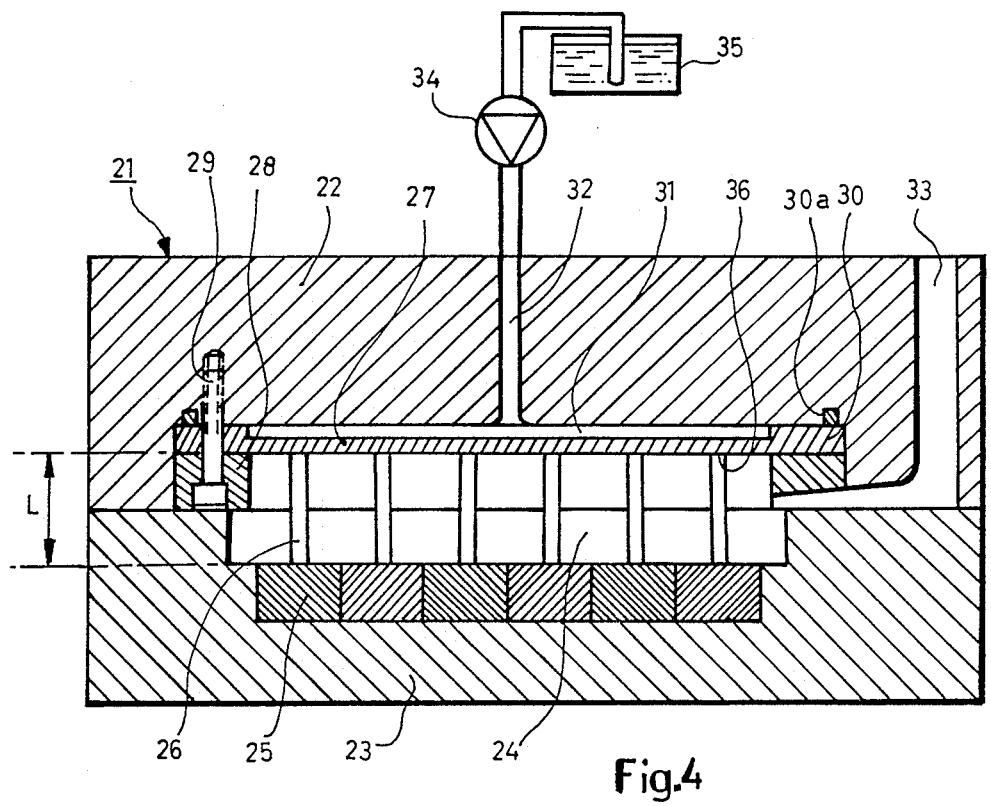
FIG. 4 is a cross section of an inventive mould for injection moulding.

An embodiment example of the invention is illustrated in FIG. 4. A mould 21 for injection moulding the plastic body to the mentioned electrical connection means has an upper 22 and a lower 23 mould half. These mould halves are kept in mutual engagement by unillustrated means in a corresponding way as that illustrated in FIG. 1. The halves 22 and 23 each has a recess for a cavity 24 in the mould 21. The core blocks 25 are fastened in the recess in the lower half 23, and each block has two cores for shaping holes in the plastic body. The recess in the upper half has a diaphragm 27, which constitutes a defining wall in the cavity 24. The diaphragm 27 is retained in the recess in the upper half with the aid of an intermediate member 28, which is fixed to the upper half 22 with the aid of screws 29. The diaphragm 27 has an edge part 30, the thickness of which is greater than that of the diaphragm. Between this edge part and the bottom of the recess is gasket 30a. Behind the diaphragm, on its side facing away from the cavity 24 there is a space 31 defined by the rear side of the diaphragm and the bottom of the recess in the upper half 22. There is a duct 32 through this half to the space 31, and a sprue 33 extends through the upper half 22 to the cavity 24. Raw material, plastics in the example, can be injected under pressure through the sprue into the cavity 24 to form the plastics body. The raw material is injected with the aid of an injection means which is not illustrated in FIG. 4. As mentioned, injection takes place under high pressure. With the above-described mould 21, the space 31 behind the diaphragm 27 is filled with a medium, e.g. oil, which is put under pressure with the aid of a pump 34 and an associated oil reservoir 34, which are schematically illustrated in the Figure. The pressurised oil is capable of bulging the diaphragm 27 and keeping it in engagement against the ends 36 of the cores 26 during injection. The material in the mould halves 22 and 23 is compacted during injection, as described above, but since the diaphragm 27 bulges out, this changing shape of the mould 21 is compensated. The oil pressure in the space 31 can be applied before injection starts, and this oil pressure and the pressure in the injection means can be selected mutually independently.

Figure 5:
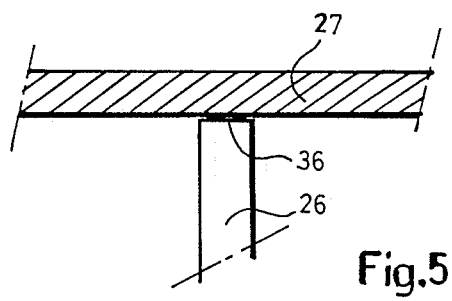
FIG. 5 illustrates the end of a core for the inventive mould.

The core blocks 25 have substantially the same implementation as illustrated in FIG. 2. The ends 36 of the cores 26 may have a simple embodiment in the inventive mould, which is more closely illustrated in FIG. 5. The ends 36 are flat and engage against the flat diaphragm 27.

Figure 6:
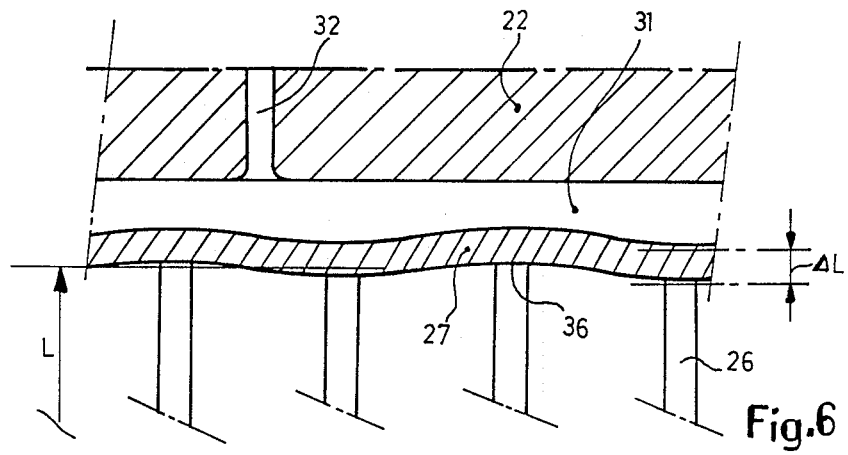
FIG. 6 is a diaphragm in cross section and cores of the inventive mould.

The core 26 in the embodiment example illustrated in FIG. 4 has a nominal length L. The actual length of cores deviates from the nominal length, due to limited manufacturing accuracy. The deviations from the nominal length L which can be permitted are relatively great for the inventive mould 21, since the diaphragm 27 can assume a curvilinear profile, as illustrated in FIG. 6. The actual length of the core 26 is within an interval ΔL about the nominal length L. By selecting a suitable thickness of the diaphragm 27, the latter can be deflected under the action of the oil pressure in the space 31 to engage against the ends 36 of all the cores 26 in the mould 21. The injected material is thus prevented from penetrating between the diaphragm 27 and the ends 36 of the cores 26.

As mentioned above in connection with FIG. 3, the cores can be deflected laterally under the action of forces from the material injected through the sprue 33. In the inventive mould 21, this lateral deflection is prevented by the cores 26 engaging securely against the diaphragm 27, as described above. Due to the action of friction forces between the ends 36 of the cores and the diaphragm 27, the cores are kept in their desired straight position during injection of the material. The force with which the diaphragm 27 engages against the ends 36 of the cores 26 is dependent, inter alia, on the oil pressure in the space 31, the thickness of the diaphragm 27 and the size of the length interval ΔL.

Figure 7:
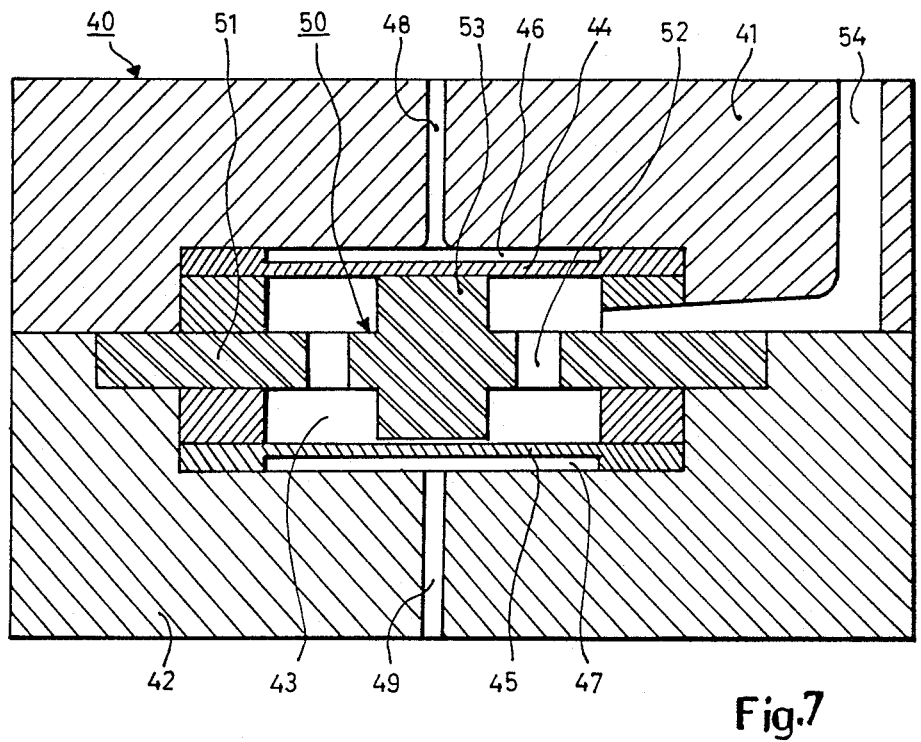
FIG. 7 is a cross section of an alternative embodiment of the invention.

An alternative embodiment of the invention is illustrated in FIG. 7. A mould 40 has an upper 41 and lower 42 half, each with its recess for a cavity 43. The recess in the upper half 41 has a first diaphragm 44, constituting a first defining wall of the cavity 43. The recess in the lower half 42 has a second diaphragm 45 constituting a second defining wall of the cavity 43. Behind the diaphragms 44 and 45 there are spaces 46 and 47, respectively which can be connected via ducts 48 and 49 to an unillustrated oil pump. The cavity 43 is provided with a metal block 50 around which plastics material shall be injected. The block 50 has the shape of a plate 51 provided with holes 52 and a projection 53 on either side of the plate. It is desirable that the end surfaces of the projections 53 are free from plastics residue after injection. Oil is introduced into the spaces 46 and 47 via ducts 48 and 49 and is pressurised as described in connection with FIG. 4. The diaphragms 44 and 45 deflect when the oil is pressurised and engage against the ends of the projections 53. Plastics material is injected through a sprue 54 and is distributed in the cavity 43 via the holes 52.

Figure 8:
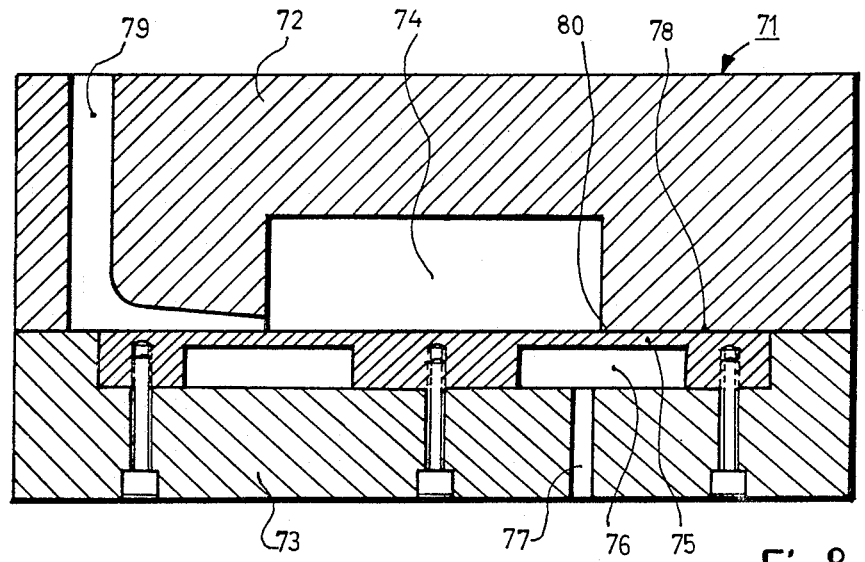
FIG. 8 is a cross section of a further alternative embodiment of the invention and FIG. 9 is a cross section of the mould in FIG. 4 connected to an injection means and a hydraulic system.

A further embodiment of the invention is illustrated in FIG. 8. A mould 71 for injection moulding plastics has an upper 72 and a lower 73 mould half. The upper half has a recess constituting the mould cavity 74. The lower half 73 is flat and has a diaphragm 75 defining a space 76 in this half on the rear side of the diaphragm. The space 76 has a duct 77 through which pressurised oil can be introduced into the space 76. The upper half has an engagement surface 78 engaging against the lower half, and the diaphragm 75 extends under this engagement surface. Raw material is injected into the cavity 74 via a sprue 79, and oil in the space 76 is pressurised. This causes the diaphragm 75 to deflect and engage against the edge region 80 of the engagement surface 78. The diaphragm thus prevents the raw material from coming in between the halves 72 and 73 and counteracts the formation of flash on the edges of the moulded product.

Figure 9:
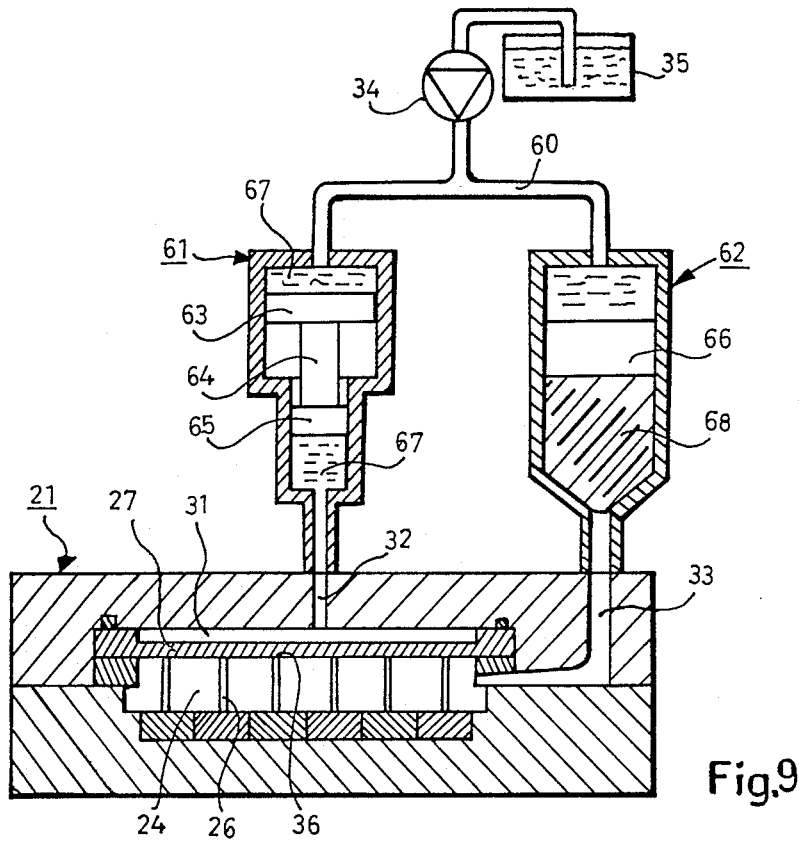

In FIG. 9 there is schematically illustrated the inventive mould 21 according to FIG. 4 connected to a hydraulic apparatus, through which raw material 68 is injected into the cavity 24, and oil is supplied to the space 31. The hydraulic apparatus includes the pump 34 oil reservoir 35. The pump is connected via a pressure line to a pressure booster 61 and an injection means 62 for the raw material. The pressure booster has a first chamber with a first piston 63 which is connected via a plunger 64 to a second piston 65 in a second chamber. The piston 63 has a larger area than the second piston 65 and the piston move in the longitudinal direction of the plunger. The second chamber is connected via the duct 32 to the space 31. The injection means 62 has a chamber for the raw material, above which there is a piston 66, which is movable in the longitudinal direction of the chamber. The injection means is connected via the sprue 33 to the cavity 24. The space between the pump 34 and pistons 63 and 66, respectively, are filled with oil 67 from the reservoir 35. The space 31 and the space above the piston 65 are filled with oil, and the chamber of the injection means under the piston 66 is filled with the raw material 68. When a product is injection moulded, the pump 34 supplies oil under pressure, which varies during injection, causing the pistons 63 and 66 to be displaced. The plastics material is thus injected under pressure into the cavity 24 and the piston 63 actuates the piston 65 for supplying pressurised oil to the space 31. The pressure in the space 31 is greater than the pressure which the injection means is capable of providing in the cavity 24, due to the first piston 63 of the pressure booster 61 having a greater area than its second piston 65. The oil in the space thus keeps the diaphragm 27 in engagement against the ends of the cores 36 during the entire injection operation, due to its greater pressure. In accordance with a variation of this embodiment, the space 31 and injection means 62 may be connected to individual pumps, in which case the pressure in the space 31 can be raised to a desired value before injection is started. Trials have been carried out using a moulding tool in accordance with FIGS. 4 and 9 for injection moulding plastic boides. At a pressure in the injection means 62 in the order of magnitude 400 bar and a pressure in the space 31 in the order of magnitude 230 bar, the plastic material in the cavity 24 displaced the diaphragm 27 so that the plastics material could come in between the ends of the cores 36 and the diaphragm. On a renewed attempt, the pressure in the space 31 was increased to 450 bar and the penetration of the plastics between the ends of the cores and the diaphragm was avoided. The holes through the plastics body were smooth along their entire length and did not have any flash at the core print. Attempts with good results have also been made at higher pressures, e.g. 1000 bar for the injection means and 1400 bar in the space 31.

Injection moulding of plastics has been described in the above-mentioned embodiment examples of the invention. However, the inventive moulding tool can be utilised for other materials, e.g. for compression moulding of metals or vulcanising rubber. The plastics material can be of different composition, e.g. as powder or melted. The medium supplied to the space 31 behind the diaphragm 27 has been a liquid (oil) in the examples, but may be a gaseous medium.

The invention can be applied to a mould without a sprue, e.g. in a process where a product is preformed in a preforming mould of known embodiment. The preformed product is placed in an inventive mould with a diaphragm and subjected to a further moulding operation, e.g. curing. An inventive mould for this process is of the same embodiment as illustrated in FIG. 7, for example, but does not have the sprue 54.

The inventive moulding tool has several advantages compared with known tools. The cores 26 have a simple embodiment, as described in connection with FIG. 5. In spite of the simple implementation of the cores, products having a very high quality are obtained. In the inventive mould the cores are subjected to considerably less deformation than in known moulding tools, and have therefore greater life span. There is thus avoided production downtime and repair costs, which are considerable in known moulding tools. The manufactured products do not have flash after moulding, and further work on them is avoided.

I claim:

1. Moulding tool including a mould with a cavity in which raw material intended for moulding a body is introduced and moulded under pressure, at least one diaphragm defining the cavity, a space at the diaphragm on its side facing away from the cavity and a duct to this space through which a pressurised medium can be supplied to said space, wherein a solid body is retained by the mould in the cavity during moulding, and the diaphragm is kept, by the action of the pressurised medium in the space in engagement against a surface of the solid body.

2. Moulding tool as claimed in claim 1, in which the mould includes two separable mould halves and where the diaphragm is fastened to one of the mould halves, wherein the solid body includes a core fastened at one end in the second of the halves, the core leaving a recess in the body formed by the raw material when the body is removed from the cavity.

3. Moulding tool as claimed in claim 2, wherein the ends of the cores facing towards the diaphragm are flat.

4. Moulding tool as claimed in claim 1, in which the mould includes two separable mould halves, wherein the solid body is released from the mould when the mould halves are separated, and accompanies the body moulded from the raw material when this body is removed from the cavity.

5. Moulding tool as claimed in claim 1 wherein the mould has at least one sprue to the cavity through which the raw material intended for moulding is introduced under pressure.

* * * * *